United States Patent Office 3,127,445
Patented Mar. 31, 1964

3,127,445
METHOD FOR THE MANUFACTURE OF NITROGENOUS ORGANIC PHOSPHORUS COMPOUNDS
Hans Binder, Frankfurt am Main, and Rudolf Heinle, Rottweil (Neckar), Germany, assignors to Rottweiler Kunstseidefabrik AG., Rottweil (Neckar), Germany
No Drawing. Filed May 3, 1960, Ser. No. 26,418
3 Claims. (Cl. 260—551)

This invention relates to the production of useful nitrogenous organic compounds from compounds containing phosphorus and nitrogen and more particularly to the process of easily reacting compounds such as phosphorus containing diimides.

Three prior proposals show the manufacture of novel, nitrogenous organic phosphorus compounds which are derived from phosphorus acid or from ortho-phosphoric acid. Contrary to the numerous, previously described nitrogenous organic compounds derived from phosphorous acid or ortho-phosphoric acid and whose molecule has only one double bond between phosphorus and oxygen, the compounds produced according to the above-mentioned three methods contain as a second double bond in the molecule one between phosphorus and nitrogen. The new compounds of this kind are produced by the fact that, under reaction conditions, only 1 part of the reacting primary amines reacts with two Cl atoms of the respective dichloride whereby a double bond between nitrogen and phosphorus, i.e., as an imide of the phosphorous or ortho-phosphoric acid with an organic substituent, must thus necessarily be produced. According to this invention, this result is achieved by the fact that primary amines of this kind, possibly dissolved in an inert solvent and which can easily react with the chlorine atoms linked to the phosphorus, are added slowly drop by drop, if necessary under boiling heat, in such amounts to an alkyl, cycloalkyl, aryl or aralkyl phosphonium acid dichloride or monoester, preferably arylester, of the ortho-phosphoric acid dichloride, which could, if necessary, also be dissolved in an inert solvent, that the two chlorine atoms of the phosphorus are entirely replaced by 1 nitrogen atom and the thus separated hydrochloric acid is bonded by two additional moles of the primary amine. In the cases in which the amine reacts with difficulty with the chlorine atoms linked to the phosphorus, one mole of the said phosphonium or phosphoric acid dichloride can be caused to react with one mole of the amine by autoclave heating whereby the separated hydrochloric acid is simultaneously captured by two additional moles of the same amine or by the addition of a tertiary amine like pyridine.

The phosphonium or phosphoric acid diimides thus produced are in conformity with the general formula:

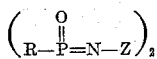

wherein R may denote any substituted aliphatic, aromatic, araliphatic or cycloaliphatic radical, namely as a direct C—P bond, that is a phosphorus acid derivative, or an aromatic or hydroaromatic radical in a C—O bond, that is as an ortho-phosphoric derivative. The radical linked to Z may also comprise the same groups whereby also the use of diamines or hydroxyalkyl amines is not excluded. As indicated in the prior suggestions, the phosphonium acid or phosphoric acid ester imides have, according to molar determination, shown up as a dimeric is considered to have the general attributes of the dimer of the imide, probably according to the general formula:

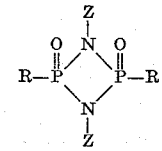

But apparently, this dimerization is of a rather loose nature, for also the dimeric phosphonium or ortho-phosphoric imides have, in view of the reactivity to be expected due to their unsaturated character, retained the two simple imides.

The object of this invention is a process for the reaction of the previously described dimeric imides with any compounds that contain a reactive hydrogen atom.

The simplest of compound for reaction with the dimeric imides is water; furthermore also: univalent or polyvalent alcohols, phenols, cycloaliphatic alcohols, ester or diketones with a reactive H atom, such as ethyl malonate or acetylacetone, carboxylic acids, primary aliphatic amines including diamines or oxamines, aromatic or hydroaromatic amines.

If we assume for simplicity's sake the monomeride formulation of the phosphonium or phosphoric acid ester imides, the reaction can be illustrated as follows:

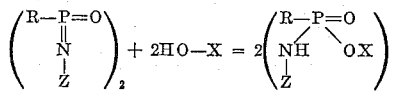

provided that water, an alcohol or a carboxylic acid is used as an additive, where the radical X denotes an H atom in the case of water. Thus, upon the use of an amine of the general formula $H_2N$—Y the compounds of the following type are produced:

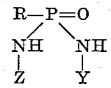

in which, when using a diamine in excess, the radical Y may hold a terminal amino group while, upon using only 1 mole of diamine for 2 moles of an amide intended as a monomeride, compounds of the following type may result:

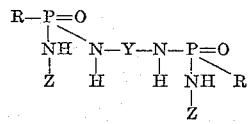

The same applied when glycol is being used in the ratio of only ½ mole per phosphorus atom or, otherwise, in excess.

Upon the use of reaction components that are sensitive with respect to the required reaction conditions, the end product can also be different, composition-wise, from the expected result. Thus, upon the effect of malonic acid ester diethyl on di-phenyl phosphonium acid cyclohexylimide we obtain not the expected compound:

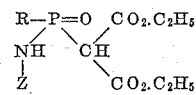

but, under the separation of $CO_2$, the compound:

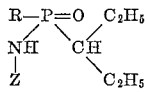

Similarly, with the presence of acetylacetone among the reaction conditions a separation of the acetyl group takes place so that the end product contains only the acetonyl group. Nevertheless, also such reactions come by all means within the scope of this invention since the reaction between the reactive point of the additive component and the imide correspond exactly to the above-indicated reaction diagram and since possibly occurring changes of the additive components are in this respect of a secondary importance.

From the fact that the prior proposals indicate that, at room temperature, phosphonium respectively phosphoric acid ester imides do not produce any change of the imide upon purification with water and methanol, in other words with substances capable of addition to the imide, it is already evident that the reactions to be carried out in accordance with this invention require stronger reaction conditions. It is best to work in autoclaves in temperatures from 140 to 250° with or without the presence of a solvent whereby the additive that is often applied in excess may serve as a solvent. In some cases it is also possible to work under reflux.

If other solvents are being used, they must of course not contain any groups capable of reacting with the imide group. Such solvents are, for instance, benzene, xylene, dioxane or anisole. If water is being used as the additive component, lower temperatures than those indicated above have to be used, since at too elevated temperatures the hydrolyzing power of the water exceeds the additive power to the imide and the imide radical Z is separated off as an amine radical which can be found as an ammonium salt of the phosphonium acid or of the phosphoric acid ester components in the product of the reaction.

As shown above, the possibility of variations of the R and Z radicals in the diphosphonium respectively in the phosphoric acid ester imides on the one hand and the numerous compounds capable of addition to them on the other produces a quite extraordinary combination possibility regarding the end products to be obtained. Some of the below-mentioned examples refer to compounds already specified at an earlier date but they have always been produced by means other than those described in this application since the phosphonium respectively the phosphoric acid ester imides were hitherto unknown. The raw products of the previously specified end products were the corresponding dichlorides where each Cl atom was individually replaced by a substituent. The technical progress of this invention resides in the fact that the Z radical is absolutely fixed in the imides and that the additive is thus being absorbed in the molecule in stoichiometrical ratio to the Z radical, while it is difficult to introduce directly two different components of the same molar ratio in the dichloride.

In view of the extraordinary variety of compounds that can be obtained in accordance with the process of this invention, particularly since three substituents of the molecule are variable, it is possible to produce according to this process substances of the most variegated application possibilities, among them: fungicides, insecticides, flame protecting agents, lubricants, pharmaceutic preparations. Depending on the nature and number of the terminal reactive groups, some substituents are furthermore suitable for the manufacture of polymerizates respectively for the insertion of polymerizates in plastics.

The invention is described below through a number of examples composed of six groups depending on the fact whether the substituent R at the phosphorus is an alkyl, aryl, aralkyl or cycloalkyl radical or an aryl or cyclohexyl radical bonded by oxygen to the phosphorus.

*Example I*

(a) Ethyl phosphonium acid cyclohexyl imide is heated with cyclohexanol in excess under pressure for five hours to 230°. After distilling off of the cyclohexanol crystals are separated out which, after scouring with acetic ester and double recrystallization out of acetic acid, indicate a melting point of 117°. The substance is soluble in hot water, methanol, ethanol, chloroform, chlorobenzene, glacial acetic acid. It represents the ethyl phosphonium acid cyclohexylamidohexahydrophenylester.

Yield: 35–45%.

$C_{14}H_{28}O_2NP$

|  | Computed | Found to exist |
|---|---|---|
| Percent N | 5.13 | 4.98 |
| Percent P | 11.34 | 11.15 |

(b) Similarly, by heating for five hours of ethyl phosphonium acid cyclohexyl imide with benzyl alcohol to 240° the ethyl phosphonium acid cyclohexylamido benzyl ester with a fusion point 194–195° is obtained.

Yield: 30–40%.

$C_{15}H_{24}O_2NP$

|  | Computed | Found to exist |
|---|---|---|
| Percent N | 4.98 | 4.67 |
| Percent P | 11.2 | 10.70 |

(c) After heating of ethyl phosphonium acid cyclohexyl imide under pressure with cyclohexylamine in excess for five hours to 150°, we obtain first a reddish, greasy residue after the distilling off of the cyclohexyl amine, the solution of which will, after several days in a small amount of chloroform, separate out ethyl phosphonium acid dicyclohexylamide crystals which show a melting point of 161–162° after several recrystallizations. The solubility is similar to the compounds produced under (a) and (b).

Yield: 50–60%.

$C_{14}H_{29}ON_2P$

|  | Computed | Found to exist |
|---|---|---|
| Percent N | 10.30 | 10.15 |
| Percent P | 11.40 | 11.32 |

(d) After heating ethyl phosphonium acid cyclohexyl imide under pressure for five hours with excess aniline to 240°, crystals are separating out after cooling off which, after scouring with benzene and recrystallization out of methanol acetic ester, show a melting point of 182°. The ethyl phosphonium acid cyclohexylamideanilide is soluble in water, methanol, ethanol and glacial acetic acid.

Yield: 30–40%.

$C_{14}H_{23}ON_2P$

|  | Computed | Found to exist |
|---|---|---|
| Percent N | 10.50 | 10.34 |
| Percent P | 11.62 | 11.39 |

(e) Ethyl phosphonium acid anil is heated under pressure with a small amount of excess phenol dissolved in dry dioxane for four hours to 150°. The residue remaining after the distilling off of the dioxane is absorbed in acetic acid ethyl ester. After the distilling off of the acetic acid ethyl ester, the ethyl phosphonium acid phenyl esteranilide remains as a brown, viscous, non-crystallizing substance:

Yield: 30–40%.

$C_{14}H_{16}O_2NP$

|  | Computed | Found to exist |
|---|---|---|
| Percent N | 5.36 | 4.93 |
| Percent P | 11.88 | 11.31 |

(f) After heating ethyl phosphonium acid anil with excess cyclohexylamine under pressure for four hours to 200°, the exces cyclohexylamine is distilled off, the residue is absorbed in the acetic acid ethyl ester and distilled off after the separating out of impurities of the acetic acid ethyl ester, whereby the ethyl phosphonium acid aniline cyclohexylamide is precipitated in a crystalline form. After recrystallization out of acetic acid ethyl ester, it indicates a melting point of 153–155° and is soluble in ethanol, carbon tetrachloride, benzene, glacial acetic acid and to a lesser degree in acetic acid ethyl ester.

Yield: 50–60%.

$C_{14}H_{23}ON_2P$

|  | Computed | Found to exist |
|---|---|---|
| Percent N | 10.51 | 10.33 |
| Percent P | 11.62 | 11.51 |

*Example II*

(a) Phenyl phosphonium acid cyclohexylimide in the presence of anisole is heated under pressure with excess phenol for five hours to 190–200°. After distilling off of the anisole and dissolving the residue in acetic acid ethyl ester, white crystals of the phenyl phosphonium acid cyclohexylamine phenylester are separated out which after recrystallization out of acetic acid ethyl ester and out of acetic acid ethyl ester ethanol show the melting point 234–236°.

Yield: 50–60%.

$C_{18}H_{22}O_2NP$

|  | Computed | Found to exist |
|---|---|---|
| Percent N | 4.44 | 4.41 |
| Percent P | 9.85 | 9.30 |

(b) Phenyl phosphonium acid cyclohexylimide is heated under pressure with excess cyclohexylamine for five hours to 170°. Upon cooling off, the phenyl phosphonium acid dicyclohexylamide is separating out in form of white needles which, after recrystallization out of aqueous methanol, indicated a melting point of 169° and were soluble in methanol, ethanol, acetic acid ethyl ester, acetone, methyl chloride, chloroform, anisole, dioxane, benzene, toluene, xylene and chlorobenzene.

Yield: 70–80%.

$C_{18}H_{29}ON_2P$

|  | Computed | Found to exist |
|---|---|---|
| Percent N | 8.74 | 8.62 |

(c) 3.93 g. of phenyl phosphonium acid cyclohexylimide are heated together with 1.07 g. glacial acetic acid and 5 cc. of anisole in the bomb tube for five hours to 180–200°. After distilling off of the anisole, there remains a viscous, red-brown resin which, even after the purification through several dissolving attempts in ethanol and precipitating with petroleum ether, does not crystallize. The acetyl phenyl phosphonium acid cyclohexyl- amide is soluble in methanol, ethanol, ether, acetic ether, dioxane and glacial acetic acid.

Yield: 25–35%.

$C_{14}H_{20}O_3NP$

|  | Computed | Found to exist |
|---|---|---|
| Percent N | 4.98 | 4.79 |
| Percent P | 11.02 | 10.41 |

(d) 5.8 g. phenyl phosphonium acid cyclohexylimide are heated under reflux for three hours with 20 cc. pure aqueous acetyl acetone. Out of the strongly acetic acid smelling solution separate white crystal flakes which, after recrystallization, melt under decomposition at 285 respectively 290°. The substance is soluble in water, methanol, ethanol and glacial acetic acid and represents according to analysis not the expected acetyl acetonyl phenyl phosphonium acid cyclohexylamine, but the acetonyl phenyl phosphonium acid cyclohexylamine, produced through the acetic acid separation.

Yield: 30–40%.

$C_{15}H_{22}O_2NP$

|  | Computed | Found to exist |
|---|---|---|
| Percent N | 5.02 | 5.23 |
| Percent P | 11.11 | 11.15 |

(e) 1 mole of pure phenyl phosphonium acid cyclohexylimide together with 2 moles of malonic acid ethyl ester are heated under pressure in 300 cc. anisole for five hours to 200°. After cooling off, a strong $CO_2$ overpressure prevails in the reaction vessel. After the distilling off of the anisole and malonic acid ethyl ester, there remains a non-crystallizable red-brown substance which represents the phenyl isoamyl phosphonium acid cyclohexylamine produced through the $CO_2$ separation.

Yield: 30–40%.

$C_{17}H_{28}ONP$

|  | Computed | Found to exist |
|---|---|---|
| Percent N | 4.77 | 4.33 |
| Percent P | 10.56 | 9.80 |

*Example III*

Benzyl phosphonium acid cyclohexylamine is heated with the theoretical amount of phenol in the presence of xylene under pressure to 200° for four hours. A yellowish crystalline substance separates out upon cooling. After several scourings with ether it is recrystallized out of benzene acetic acid ethyl ester and xylene and represents the benzyl phosphonium acid phenylester cyclohexylamide in form of fine needles having a melting point of 198–200°. This substance is soluble in water, methanol, benzene, chloroform and carbon tetrachloride.

Yield: 25–35%.

$C_{19}H_{24}O_2NP$

|  | Computed | Found to exist |
|---|---|---|
| Percent N | 4.25 | 3.99 |
| Percent P | 9.44 | 8.70 |

*Example IV*

(a) Cyclohexyl phosphonium acid cyclohexylimide is heated with excess methanol under pressure for five hours to 150°. The crystal flakes separated out upon cooling show after recrystallization out of dioxane-glacial acetic acid the melting point of 260–265°. The cyclohexyl phosphonium acid methyl ester cyclohexylamide is soluble in glacial acetic acid, glycerin and chloral hydrate.

Yield: 80–90%.

$C_{13}H_{26}O_2NP$

|  | Computed | Found to exist |
|---|---|---|
| Percent N | 5.40 | 5.28 |
| Percent P | 11.95 | 11.44 |

(b) Cyclohexyl phosphonium acid cyclohexylimide is heated under pressure with excess cyclohexylamine for five hours to 200°. The fine needles separated out after two recrystallizations out of dioxane-water have a melting point of 280–281°. The cyclohexyl-dicyclohexyl phosphonium acid amide is soluble in methanol, ethanol, acetone, acetic ester, dioxane, tetrahydrofuran, chloroform, carbon tetrachloride, benzene, toluene, xylene and chlorobenzene.

Yield: 80–90%.

$C_{18}H_{35}ON_2P$

|  | Computed | Found to exist |
|---|---|---|
| Percent N | 8.57 | 8.45 |
| Percent P | 9.49 | 9.00 |

*Example V*

(a) Phosphoric acid phenylester cyclohexylimide is heated under pressure with anhydrous methanol for five hours to 150°. The white crystal substance remaining after the cooling off and distilling off of the methanol melts after several recrystallizations at 268–269°. The phosphoric acid pheny-methyl-ester cyclohexylamide is soluble in methanol, ethanol, glacial acetic acid and not very soluble in water.

Yield: 70–80%.

$C_{13}H_{20}O_3NP$

|  | Computed | Found to exist |
|---|---|---|
| Percent N | 5.21 | 5.39 |
| Percent P | 11.51 | 11.33 |

(b) Like in Example V(a), by using iso-propanol the phosphoric acid phenylisopropylester cyclohexylamide having a melting point of 271° is produced.

Yield: 60–70%.

$C_{15}H_{24}O_3NP$

|  | Computed | Found to exist |
|---|---|---|
| Percent P | 10.42 | 10.42 |

(c) Phosphoric acid phenylester cyclohexylimide is heated under pressure with excess phenol in the presence of benzene for five hours to 150°. The reddish separation of crystals is pure after scouring with petroleum ether and recrystallization out of 50% methanol and water melts at 199–200°.

Yield: 70–80%.

The phosphoric acid diphenylester cyclohexylamide is soluble in water, methanol, ethanol and glacial acetic acid.

$C_{18}H_{22}O_3NP$

|  | Computed | Found to exist |
|---|---|---|
| Percent N | 4.22 | 4.27 |
| Percent P | 9.35 | 9.44 |

(d) 1/5 mole phosphoric acid phenylester cyclohexylimide and 1/10 mole anhydrous glycol are dissolved in 50 cc. anisole and heated under pressure for five hours at 150°. Within 48 hours, crystals separate out of the cooled deposit, which crystals can be isolated by dilution of the deposit with glacial acetic acid, drawing off by suction and repeated scouring with acetic acid ethyl ester. After recrystallization out of acetonitrile and the amount of water required for dissolution, the substance melts at 254–256°. The diglycolester of the phosphoric acid phenylester cyclohexylamide is soluble in water, methanol, ethanol, glycol and glacial acetic acid.

Yield: 40–50%.

$C_{26}H_{38}O_6N_2P_2$

|  | Computed | Found to exist |
|---|---|---|
| Percent N | 5.22 | 5.32 |
| Percent P | 11.55 | 11.47 |

(e) Similar to Example V(d) but by using a glycol in excess and without the presence of anisole, we obtain after distilling off of the glycol, a brown oil that is purified by repeated dissolving in aqueous ethanol and reprecipitation with acetonitrile and is finally vacuum-dried. The yellow, strongly hygroscopic oil which represents the phosphoric acid phenyl-mono-glycolester cyclohexylamide is soluble in water, glycol and glacial acetic acid.

Yield: 35–45%.

$C_{14}H_{22}O_4NP$

|  | Computed | Found to exist |
|---|---|---|
| Percent N | 4.68 | 4.67 |
| Percent P | 10.36 | 10.55 |

(f) Phosphoric acid phenylester cyclohexylimide in which cyclohexylamine hydrochloride is still contained from the manufacturing process is heated under pressure with excess butylamine for five hours to 150°. The reaction product is repeatedly dissolved in glycol and precipitated with water until the chloride reaction disappears. The reaction product of chloroform is a viscous, amber-colored resin. The phosphoric acid phenylester cyclohexyl butylamide is soluble in alcohols, ether, acetic ester, chloroform, carbon tetrachloride, benzene, toluene and chlorobenzene.

Yield: 30–40%.

$C_{16}H_{27}O_2N_2P$

|  | Computed | Found to exist |
|---|---|---|
| Percent N | 9.01 | 8.90 |
| Percent P | 9.98 | 9.75 |

(g) After heating phosphoric acid phenylester cyclohexylimide under pressure for five hours with excess cyclohexylamine to 180°, crystals are produced upon cooling that, after recrystallization out of methanol acetic acid ethyl ester, can be obtained in form of fine needles having a melting point of 202°. The phosphoric acid phenylester dicyclohexylamide is soluble in water, methanol, ethanol, chloroform, toluene, chlorobenzene.

Yield: 75–85%.

$C_{18}H_{29}O_2N_2P$

|  | Computed | Found to exist |
|---|---|---|
| Percent N | 8.32 | 8.25 |
| Percent P | 9.21 | 8.90 |

(h) Similar to Example V(g) by using excess aniline the phosphoric acid phenylester cyclohexylamide anilide is produced that, after recrystallization out of methanol, melts at 212°. It is soluble in H₂O, methanol, ethanol, glacial acetic acid and chlorobenzene.

Yield: 70–80%.

$C_{18}H_{23}O_2N_2P$

|  | Computed | Found to exist |
|---|---|---|
| Percent N | 8.47 | 8.53 |
| Percent P | 9.37 | 9.11 |

(i) ⅙ mole of phosphoric acid phenylester cyclohexylimide is heated under pressure together with ½ mole of hexamethylene in 40 cc. benzene for eight hours to 150°. The residue that is first viscous and that remains after the distilling off of the benzene is absorbed by chloroform from which it separates out upon cooling in crystalline form and indicates a melting point of 209° after recrystallization out of water-methanol.

Yield: 40–50%.

The diphosphoric acid phenylester cyclohexylamide hexamethylene amide is soluble in methanol, ethanol, glacial acetic acid and chlorobenzene.

$C_{30}H_{48}O_4N_4P_2$

|  | Computed | Found to exist |
|---|---|---|
| Percent N | 9.48 | 9.50 |

(k) Phosphoric acid phenyl ester methyl imide is heated together with anhydrous methanol under pressure for five hours to 150°. The yellow-brown resin remaining after the distilling off of the methanol is absorbed in boiling chloroform and the solution is agitated with water. After the evaporation of the water there remains the phosphoric acid phenyl-methylester methylamide as a bright yellow, viscous resin that resists further purification.

Yield: 20–30%.

This compound is soluble in water, methanol, ethanol, acetone and chloroform.

$C_8H_{12}O_3NP$

|  | Computed | Found to exist |
|---|---|---|
| Percent N | 6.96 | 6.36 |
| Percent P | 15.40 | 14.88 |

(l) ¼ mole of phosphoric acid phenylester cyclohexylimide and ⅛ mole of anhydrous glycol are heated under pressure in the presence of 50 cc. dioxane for five hours to 220°. After the distilling off of the dioxane there remains a yellow-brown, viscous resin that is dissolved in water and that, after the filtering off of a slight turbulence and the distilling off of the water in vacuum, is isolated as a viscous, bright-yellow resin.

Yield: 30–40%.

The diglycolester of the phosphoric acid phenylester methylamide is soluble in water, ethanol, glycol and chloroform.

$C_{16}H_{22}O_6N_2P_2$

|  | Computed | Found to exist |
|---|---|---|
| Percent N | 7.00 | 6.92 |
| Percent P | 15.48 | 14.90 |

(m) Phosphoric acid phenylester benzyl imide is heated under pressure with excess phenol in the presence of xylene for five hours to 210°. The crystals separating out after cooling within 48 hours constitute however not the expected reaction product, for this is rather in the mother liquor which, after separating out of the crystals and evaporation of the xylene, leaves a dark-brown, viscous, greasy substance out of which white crystals separate after extended rest which melt at 105–107° after recrystallization out of petroleum ether and acetic acid ethyl ester.

Yield: 30–40%.

The phosphoric acid diphenylester benzylamide is soluble in hot water, methanol, ethanol, ether, acetic ester, methylenechloride, benzene and chlorobenzene.

$C_{19}H_{18}O_3NP$

|  | Computed | Found to exist |
|---|---|---|
| Percent N | 4.13 | 4.30 |

(n) Phosphoric acid phenylester benzylimide is heated with aniline in slight excess in the presence of xylene for five hours to 230–240°. After cooling, a yellow insoluble and infusible crystalline substance is precipitated which has to be separated out. After the distilling off of the xylene out of the mother liquor, there remains a brown, viscous, greasy substance that crystallizes after extended rest. After recrystallization out of acetic and ethylester methanol, the compound is melting at 184°.

Yield: 30–40%.

The phosphoric acid phenylester benzylamide anilide is soluble in methanol.

$C_{19}H_{19}O_2N_2P$

|  | Computed | Found to exist |
|---|---|---|
| Percent N | 8.28 | 7.71 |

(o) Phosphoric acid phenylester hexamethylene imide is heated under pressure with excess methanol for four hours to 150°. After distilling, there remains a non-crystallizable brown, resinous residue. The diphosphoric acid phenylmethylester hexamethylene amide is soluble in methanol, ethanol, acetone and methanol, and chloroform and methanol.

Yield: 25–35%.

$C_{20}H_{30}O_6N_2P_2$

|  | Computed | Found to exist |
|---|---|---|
| Percent N | 6.14 | 6.41 |
| Percent P | 13.58 | 12.80 |

(p) Phosphoric acid phenylester cyclohexylimide is heated under pressure with water in large excess for 17 hours to 110°. The white crystals separated out upon cooling are recrystallized out of boiling methanol with the additional amount of water required for the dissolving and can then melt at 268.5° C.

Yield: 70–80%.

The phosphoric acid monophenylester cyclohexylamide is soluble in water and in acetic acid.

$C_{12}H_{18}O_3NP$

|  | Computed | Found to exist |
|---|---|---|
| Percent N | 5.49 | 5.50 |
| Percent P | 12.15 | 12.00 |

(q) ⅒ mole of phosphoric acid phenylester anil is heated under pressure with somewhat more than ⅒ of phenol and 40 cc. xylene for five hours to 220°. After cooling, white crystals separate out which, after recrystallization out of water, accumulate as white needles having a melting point of 167–168° C.

Yield: 50–60%.

The phosphoric acid diphenylester-anilide is soluble in water, methanol, ethanol, acetone, tetrahydrofuran, toluene, xylene, chlorobenzene and glacial acetic acid.

$C_{18}H_{16}O_3NP$

|  | Computed | Found to exist |
|---|---|---|
| Percent N | 4.31 | 4.18 |
| Percent P | 9.52 | 9.33 |

(r) Phosphoric acid phenylester anil is heated under pressure with excess anhydrous cyclohexylamine for four hours to 200°. The crystals separating out upon cooling are scoured with acetic acid ethyl ester and recrystallized out of acetonitrile methanol whereupon they melt at 192–194°.

Yield: 50–60%.

The phosphoric acid phenylester cyclohexylamidanilide is soluble in water, methanol, ethanol, chloroform, dioxane, benzene, toluene, xylene and chlorobenzene.

$C_{18}H_{23}O_2N_2P$

|  | Computed | Found to exist |
|---|---|---|
| Percent N | 8.48 | 8.56 |

(s) 1/10 of a mole of phosphoric acid phenylester p-tolylimide is heated under pressure with somewhat more than 1/10 mole of phenol and 80 cc. of xylene for four hours to 220°. The small separation of crystals after cooling is supplemented through the addition of acetic acid ethyl ester. After recrystallization out of xylene, the white needles produced melt at 150°. The phosphoric acid diphenylester-p-toluidide is soluble in water, methanol, ethanol, acetic acid ethyl ester, acetone, chloroform, dioxane, tetrahydrofuran, benzene, toluene, xylene and chlorobenzene.

Yield: 30–40%.

$C_{19}H_{18}O_3NP$

|  | Computed | Found to exist |
|---|---|---|
| Percent N | 4.13 | 3.21 |
| Percent P | 9.13 | 8.55 |

*Example VI*

Phosphoric acid cyclohexylester cyclohexylimide is heated under pressure with excess cyclohexanol for four hours to 200°. After cooling, the highly fluid, greasy reaction product is dissolved with methanol and a precipitation is filtered off. After charcoal treatment the methanol is distilled out of the solution, the residue is disolved with chloroform, precipitated with ether, centrifugalized and this process is repeated twice. The reaction product in the form of long white needles melts at 225–226°.

Yield: 25–35%.

The phosphoric acid dicyclohexylester cyclohexylamide is soluble in water, acetic ester and chloroform.

$C_{18}H_{34}O_3NP$

|  | Computed | Found to exist |
|---|---|---|
| Percent N | 4.08 | 4.01 |
| Percent P | 9.02 | 8.86 |

What is claimed is:

1. The method of producing organic nitrogenous phosphorous compounds which comprises reacting a phosphorous containing imide selected from the group consisting of phosphonium acid imides and phosphorus monoesterimides of the formula

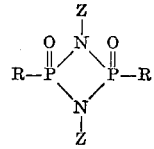

wherein R represents a member selected from the group consisting of alkyl, cycloalkyl, benzyl and phenyl, Z is a member selected from the group consisting of alkyl, cycloalkyl, benzyl, phenyl, R being linked to the phosphorous atoms by a linkage selected from the group consisting of the —C—P— and the —P—O—C— linkages, with a compound containing a reactive hydrogen atom and selected from the group consisting of water, monohydroxy alkanols, polyhydroxy alkanols acetic acid diethyl ester of malonic acid and acetyl acetone at a temperature between 110° and 240° C.

2. The method claimed in claim 1 in which the two Z substituents of the phosphorous containing imide are linked together and Z represents a bivalent olefinic member selected from the group consisting of ethylene, propylene, butylene, pentylene and hexylene members.

3. In the method as claimed in claim 1 reacting the phosphorous containing imide with a polyhydroxy alcohol in the proportion of one molecule of the imide to each hydroxy group of the polyvalent alcohol.

No references cited.